G. H. DAY.
FORMER AND SPINDLE FOR LENS CUTTING MACHINES.
APPLICATION FILED APR. 2, 1910.

1,019,308.

Patented Mar. 5, 1912.

2 SHEETS—SHEET 1.

WITNESSES:
G. V. Rasmussen
Elmer Elwin Young

INVENTOR
GEORGE H. DAY

BY
Briesen & Knauth
ATTORNEYS

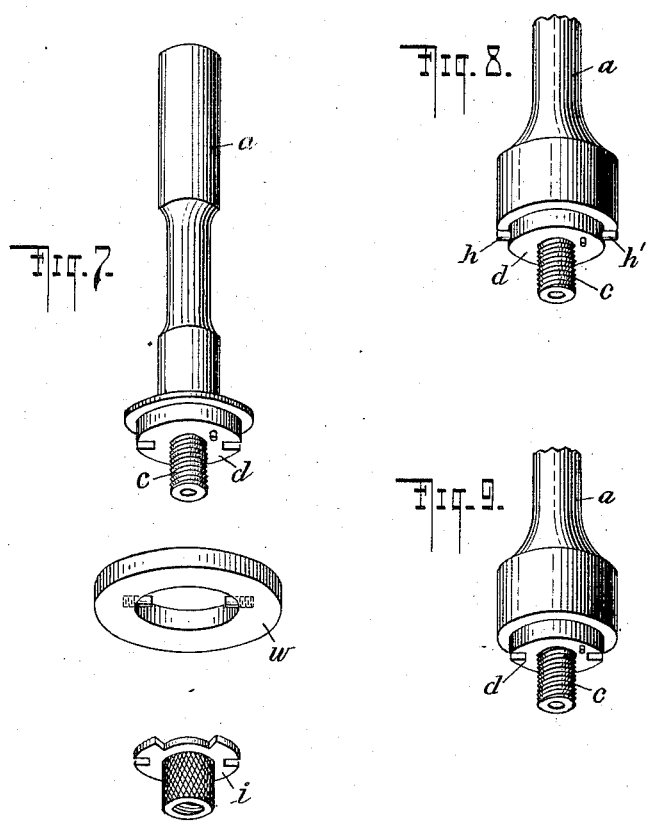

UNITED STATES PATENT OFFICE.

GEORGE H. DAY, OF SOUTHBRIDGE, MASSACHUSETTS, ASSIGNOR TO AMERICAN OPTICAL COMPANY, A CORPORATION OF MASSACHUSETTS.

FORMER AND SPINDLE FOR LENS-CUTTING MACHINES.

1,019,308. Specification of Letters Patent. Patented Mar. 5, 1912.

Application filed April 2, 1910. Serial No. 552,960.

*To all whom it may concern:*

Be it known that I, GEORGE H. DAY, a citizen of the United States, and resident of Southbridge, Worcester county, State of Massachusetts, have invented a new and useful Improvement in Formers and Spindles for Lens-Cutting Machines, of which the following is a specification.

My invention relates to improvements in machines for quickly and accurately cutting, from suitable blanks, lenses of any desired shape and size. Of a given shape, such machines may be required either to produce a number of lenses of the same size or of a variety of sizes, with perhaps but few lenses of each size.

My invention relates more particularly to lens cutting machines of the general type shown and described in United States Letters Patent Nos. 602,207 and 791,254. In these machines the lens pattern or former, suitably held above the blank upon a spindle, is revolved in correspondence with said blank so that, by means of a cutting tool, or part connected with said tool, which is kept pressed continually against the edge of said former, a complete rotation of former and blank may cause to be produced a lens of the shape of the pattern and either of the same size or some other determined size; or by suitable adjusting means the shape of the resultant lens may be varied within certain limits without changing the pattern.

In the patents referred to the spindle which holds the former is not adapted for the easy removal and exchange of one former for another although an exchange can be made.

It is the purpose of my present invention to simplify and cheapen lens cutting machines as aforesaid by providing a spindle and former such that one former may be substituted for another with a minimum loss of time. This increases the value of such machines when a variety of lenses is to be turned out and adapts them particularly to the needs of small producers; while they are equally well fitted for the production of quantities of the same size and shape when used by large producers.

Figure 1:
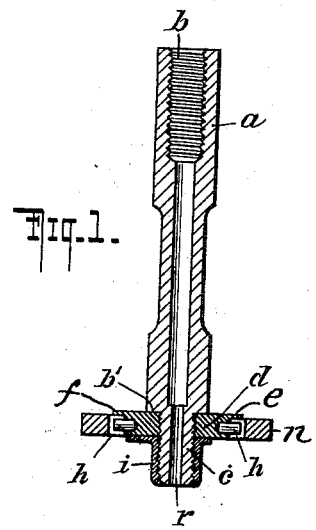
Figure 5:
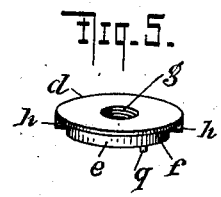
Figure 2:
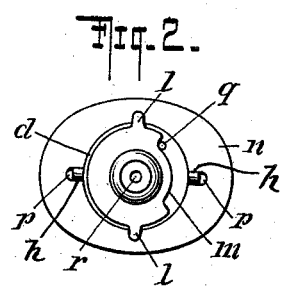
Figure 4:
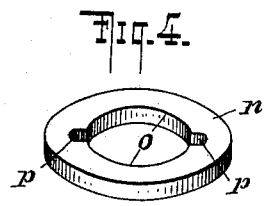
Figure 3:
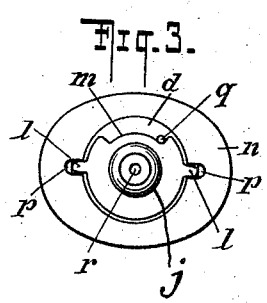
Figure 6:
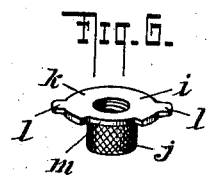

Referring to the drawings, which show a preferred construction of my improved former and spindle, Figure 1 represents an axial section through the spindle and shows a former in position; Fig. 2 is a plan, taken from below, of Fig. 1; Fig. 3 is another plan similar to Fig. 2, but showing the lock nut rotated so as to permit the former to be removed; Fig. 4 represents, in perspective, a former such as will be required to produce an ordinary elliptical lens; Fig. 5 represents, also in perspective, what I term a steady block; Fig. 6 is a similar view of the lock nut used to hold the former in position; Fig. 7 represents in perspective a modified form of my invention with the parts disassembled; Fig. 8 represents in perspective another modification of my invention, parts being omitted and broken away; and Fig. 9 similarly represents still another modification of my invention.

The construction of my improved device is as follows: An arbor $a$ is provided with a screw thread $b$ at its top for the reception of a suitable tension screw. At its bottom the arbor is turned down so as to provide a square shoulder $b'$ and a screw threaded extension $c$. A spur gear (not shown) pressed upon $a$ enables the arbor to be driven.

The steady block $d$ comprises a steel disk $e$ upon one side of which is brazed, or otherwise suitably fixed, so as to constitute a flange $f$, a second thin disk, of similar material but greater diameter. If preferred, these two disks may constitute one integral piece and be made from the solid. The block is screw threaded axially at $g$ to fit extension $c$ and radially extending pins $h$, $h$, are set in the disk $e$.

The lock nut $i$ comprises a knurled sleeve $j$ on one face of which is fixed a steel plate $k$ shaped so as to have oppositely extending radial projections $l$ and, at one side between said projections, a circumferential recess $m$ including an angle of, approximately 90°. An axial screw thread is here, as in the steady block, provided to fit the extension $c$.

The former $n$, the thickness of which should preferably be just a little less than that of disk $e$ is given the external contour which it is desired shall be had by the lens to be cut. In the example given, this contour is that of an ordinary elliptical lens. But almost any other contour usual in lenses might, if so desired, be used. Within this contour is cut an opening $o$ of uniform section in the form of a circle provided with notches, preferably diametrically opposite, $p$; the dimensions of this opening are such that the former will just comfortably slip upon disk $e$ of steady block $d$ with the notches $p$ embracing the pins $h$.

To assemble the spindle, steady block $d$ is first screwed upon extension $c$, disk $f$ being placed upward, until it is tight against the square shoulder $b'$. Lock nut $i$, with plate $k$ upward, is then engaged with extension $c$ and screwed up until it just fails of contact with the steady block, when a pin $q$ is set permanently in the lower face of said block in a hole preferably screw threaded and previously prepared for it. The relation of the various dimensions such as e. g., the pitch of thread on extension $c$, thickness of disk $e$, angle of recess $m$, etc., must be so determined that the lock nut $i$ will have its projections $l$ $l$ lying at right angles to the line of the pins $h$ $h$ of steady block $d$ when said lock nut is screwed home against the block (as shown in Fig. 2); and, when the lock nut is unscrewed (turned counterclockwise) until the other end of recess $m$ engages pin $q$ the projections $l$ $l$ must register with the pins $h$ $h$ (Fig. 3).

To position a former it is now merely necessary to rotate lock nut $i$ until projections $l$ register with pins $h$ as just described and slip the former up from below, passing the notches $p$ over the projections $l$, until stopped by flange $f$ of the steady block; then rotate the lock nut to the position shown in Fig. 2. Reversal of this operation will permit the former to be removed. It will thus be seen that one former may be exchanged for another almost instantly and without the need of removing any parts with the attendant risk of such parts being lost or mislaid.

When the former is in position upon the spindle it is keyed positively thereto by the engagement of its notches $p$ with the pins $h$; there is thus no danger of the former slipping angularly with reference to the spindle and thereby distorting the shape of the lens being produced as would be the case were the former simply clamped upon the spindle between its shoulder and an ordinary nut.

The arbor $a$ is provided with a centrally drilled hole $r$, $r$, for the reception of a bearing rod (not shown), preferably spring pressed downwardly, equivalent to the part 5 of the two patents referred to and for the same purpose, viz., to exert a downward holding pressure upon the lens blank being cut.

Fig. 7 shows in perspective with steady block $d$ in position on the spindle but with the former $n$ and lock-nut $i$ separated, a modification of the invention as above described in which the steady block and lock nut are notched while the former is provided with pins, this arrangement being a reversal of that shown in the previous figures. In the modification shown in Fig. 8, I have shown the lower end of the spindle enlarged and provided with pins $h'$ corresponding to the pins $h$ of Figs. 1 and 2, the spindle end thus itself becoming the steady block. The former and check-nut remain substantially the same as shown in Figs. 1 to 6. Fig. 9 shows another form of combined spindle end and steady block similar to Fig. 8 except that notches are provided instead of pins. For this form of spindle the former and check-nut as shown in Fig. 7 will be required.

Other changes of detail may be made without departing from the spirit of my invention.

Having now described my invention, I make the following claims:

1. In a lens cutting machine, the combination of an arbor, a steady block fixed to said arbor and provided with an outwardly extending flange upon one side thereof, a former having an opening and adapted to slip over said steady block until stopped by said flange, mutually engaging elements upon said steady block and former so that their relative rotation is prevented, and a nut rotatable upon said arbor adapted to be passed by said former in one angular position but to clamp and hold the former against the aforesaid flange when rotated from said position, substantially as described.

2. In a lens cutting machine, the combination of an arbor, a steady block fixed to said arbor and provided with an outwardly extending flange upon one side thereof, a former having an opening and adapted to slip over said steady block until stopped by said flange, mutually engaging elements upon said block and former so that their relative rotation is prevented, a nut rotatable upon said arbor adapted to be passed by said former in one angular position but to clamp and hold said former against the aforesaid flange when rotated from said position, and means limiting the angle of rotation of said nut, substantially as and for the purpose described.

3. In a lens cutting machine, the combination of an arbor, a steady block fixed to said arbor, a former having an opening and adapted to be slipped over said steady block, mutually engaging elements upon steady block and former to stop said former when slipped over the steady block, other mutually engaging elements upon steady block and former to prevent their relative rotation, a rotatable nut upon said arbor adapted to be passed when in one angular position by said former and provided with a circumferential recess, and a pin set in one face of said former and adapted to coöperate with said circumferential recess to limit the angular rotation of said nut, substantially as and for the purpose described.

4. In a lens cutting machine, the combination of an arbor provided with a flange, a rotatable clamp nut at one end of said arbor provided with radial projections, a former having an opening of notched contour and adapted to be slipped axially upon said arbor past said nut and until stopped by said flange when said projections and said notches correspond, and pins upon said arbor to engage said notches when the former has passed the nut, substantially as and for the purpose described.

In testimony whereof I have hereunto set my hand and seal in the presence of two subscribing witnesses.

GEORGE H. DAY. [L. S.]

Witnesses:
  H. H. STYTT,
  R. E. THOMPSON.

---

Copies of this patent may be obtained for five cents each, by addressing the "Commissioner of Patents, Washington, D. C."